(12) United States Patent
Jaleel et al.

(10) Patent No.: US 12,135,781 B2
(45) Date of Patent: Nov. 5, 2024

(54) IMPLEMENTING HARDWARE-BASED MEMORY SAFETY FOR A GRAPHIC PROCESSING UNIT

(71) Applicant: NVIDIA Corporation, Santa Clara, CA (US)

(72) Inventors: Aamer Jaleel, Northborough, MA (US); Mohamed Tarek Bnziad Mohamed Hassan, New York, NY (US); Mark Stephenson, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 384 days.

(21) Appl. No.: 17/565,345

(22) Filed: Dec. 29, 2021

(65) Prior Publication Data

US 2023/0061154 A1 Mar. 2, 2023

Related U.S. Application Data

(60) Provisional application No. 63/237,088, filed on Aug. 25, 2021.

(51) Int. Cl.
*G06F 21/53* (2013.01)
*G06F 9/44* (2018.01)
*G06F 9/445* (2018.01)
*G06F 12/14* (2006.01)

(52) U.S. Cl.
CPC .......... *G06F 21/53* (2013.01); *G06F 9/44589* (2013.01); *G06F 12/1441* (2013.01)

(58) Field of Classification Search
None
See application file for complete search history.

(56) References Cited

U.S. PATENT DOCUMENTS

| | | | |
|---|---|---|---|
| 7,596,721 B1 | 9/2009 | Flake et al. | |
| 9,823,851 B2 * | 11/2017 | Beale | G06F 3/0659 |
| 11,609,863 B2 * | 3/2023 | Boettcher | G06F 12/1441 |
| 11,922,171 B2 * | 3/2024 | Winterberg | G06F 9/4401 |
| 11,928,045 B1 * | 3/2024 | Bhattacharya | G06F 11/3636 |

(Continued)

FOREIGN PATENT DOCUMENTS

EP 4064058 A1 * 9/2022 ......... G06F 12/0223

OTHER PUBLICATIONS

Non-Final Office Action from U.S. Appl. No. 17/565,352, dated Mar. 27, 2023.

(Continued)

*Primary Examiner* — Philip Wang
(74) *Attorney, Agent, or Firm* — Zilka-Kotab, P.C.

(57) ABSTRACT

While a compiler compiles source code to create an executable binary, code is added into the compiled source code that, when executed, identifies and stores in a metadata table base and bounds information associated with memory allocations. Additionally, additional code is added into the compiled source code that enables hardware to determine a safety of memory access requests during an implementation of the compiled source code by performing an out-of-bounds (OOB) check in hardware using the base and bounds information stored in the metadata table. This enables the identification and avoidance of unsafe memory operations during the implementation of the executable by a GPU.

24 Claims, 10 Drawing Sheets

(56) References Cited

U.S. PATENT DOCUMENTS

| | | | |
|---|---|---|---|
| 2011/0145513 A1* | 6/2011 | Lyer | G06F 12/0868 |
| | | | 711/E12.017 |
| 2014/0143494 A1* | 5/2014 | Whalley | G06F 12/0862 |
| | | | 711/122 |
| 2018/0004445 A1 | 1/2018 | Stark et al. | |
| 2019/0121716 A1 | 4/2019 | Kurmus et al. | |
| 2019/0156008 A1 | 5/2019 | Tamura | |
| 2020/0257827 A1 | 8/2020 | Kounavis et al. | |
| 2020/0379902 A1* | 12/2020 | Durham | G06F 11/1048 |
| 2021/0200546 A1* | 7/2021 | Lemay | G06F 12/145 |
| 2021/0232511 A1* | 7/2021 | Boettcher | G06F 12/0253 |
| 2021/0405896 A1* | 12/2021 | Durham | G06F 3/0604 |
| 2023/0063568 A1* | 3/2023 | Hassan | G06F 3/0622 |
| 2024/0078233 A1* | 3/2024 | Pasupuleti | G06F 16/24552 |

OTHER PUBLICATIONS

Notice of Allowance from U.S. Appl. No. 17/565,352, dated Oct. 20, 2023.

Bialek et al., "Securtity Analysis of Memory Tagging," Microsift, Github, Mar. 2020, pp. 1-16, retrieved from https://github.com/microsoft/MSRC-Security-Research/blob/master/papers/2020/Security%20analysis%20of%20memory%20tagging.pdf.

Rodinia, "Rodinia: Accelerating Compute-Intensive Applications with Accelerators," Rodinia, 2018, 3 pages, retrieved from http://rodinia.cs.virginia.edu/doku.php.

Hawkes, B., "News and updates from the Project Zero team at Google," Project Zero, May 15, 2019, 8 pages, retrieved from https://googleprojectzero.blogspot.com/p/0day.html.

Ziad et al., "No-FAT: Architectural Support for Low Overhead Memory Safety Checks," Author's preprint, Proceedings of the 48th Annual International Symposium on Computer Architecture, Jun. 2021, pp. 1-15.

Erb et al., "Dynamic Buffer Overflow Detection for GPGPUs," CGO '17: Proceedings of the 2017 IEEE/ACM International Symposium on Code Generation and Optimization, Feb. 2017, 13 pages, retrieved from https://www.computermachines.org/joe/publications/pdfs/cgo2017_clarmor.pdf.

Hassan et al., U.S. Appl. No. 17/565,352, filed Dec. 29, 2021.

Di et al., "Efficient Buffer Overflow Detection on GPU," IEEE Transactions on Parallel and Distributed Systems, vol. 32, No. 5, May 2021, pp. 1161-1177.

Final Office Action from U.S. Appl. No. 17/565,352, dated Aug. 17, 2023.

* cited by examiner

IMPLEMENTING HARDWARE-BASED MEMORY SAFETY FOR A GRAPHIC PROCESSING UNIT

FIELD OF THE INVENTION

The present invention relates to compiling and executing applications, and more particularly to detecting, via hardware, memory safety vulnerabilities when compiling and executing applications.

BACKGROUND

Memory safety is a program property that guarantees memory objects can only be accessed (1) between their intended bounds, (2) during their lifetime, and (3) given their original or compatible type. Violating any of these requirements will result in memory corruption. For example, accessing objects beyond their intended bounds is called spatial memory safety violation, such as buffer overflow/underflow. Accessing objects beyond their lifetime is called temporal memory safety violation, such as use-after-free. Finally, accessing objects with an incompatible type is referred to as type confusion, which can lead to spatial and temporal violations. A memory safety vulnerability can enable privilege escalation, information leakage, and denial of service on a system.

Multiple defenses have been proposed to address memory safety violations in central processing units (CPUs), but there is a need to detect memory safety problems on graphic processing units (GPUs).

DETAILED DESCRIPTION

While a compiler compiles source code to create an executable binary, code is added into the compiled source code that, when executed, identifies and stores in a metadata table base and bounds information associated with memory allocations. Additionally, additional code is added into the compiled source code that performs memory safety checks during execution. This updated compiled source code automatically determines a safety of memory access requests during execution by performing an out-of-bounds (OOB) check using the base and bounds information retrieved and stored in the metadata table. This enables the identification and avoidance of unsafe memory operations during the implementation of the executable by a GPU.

Figure 1:
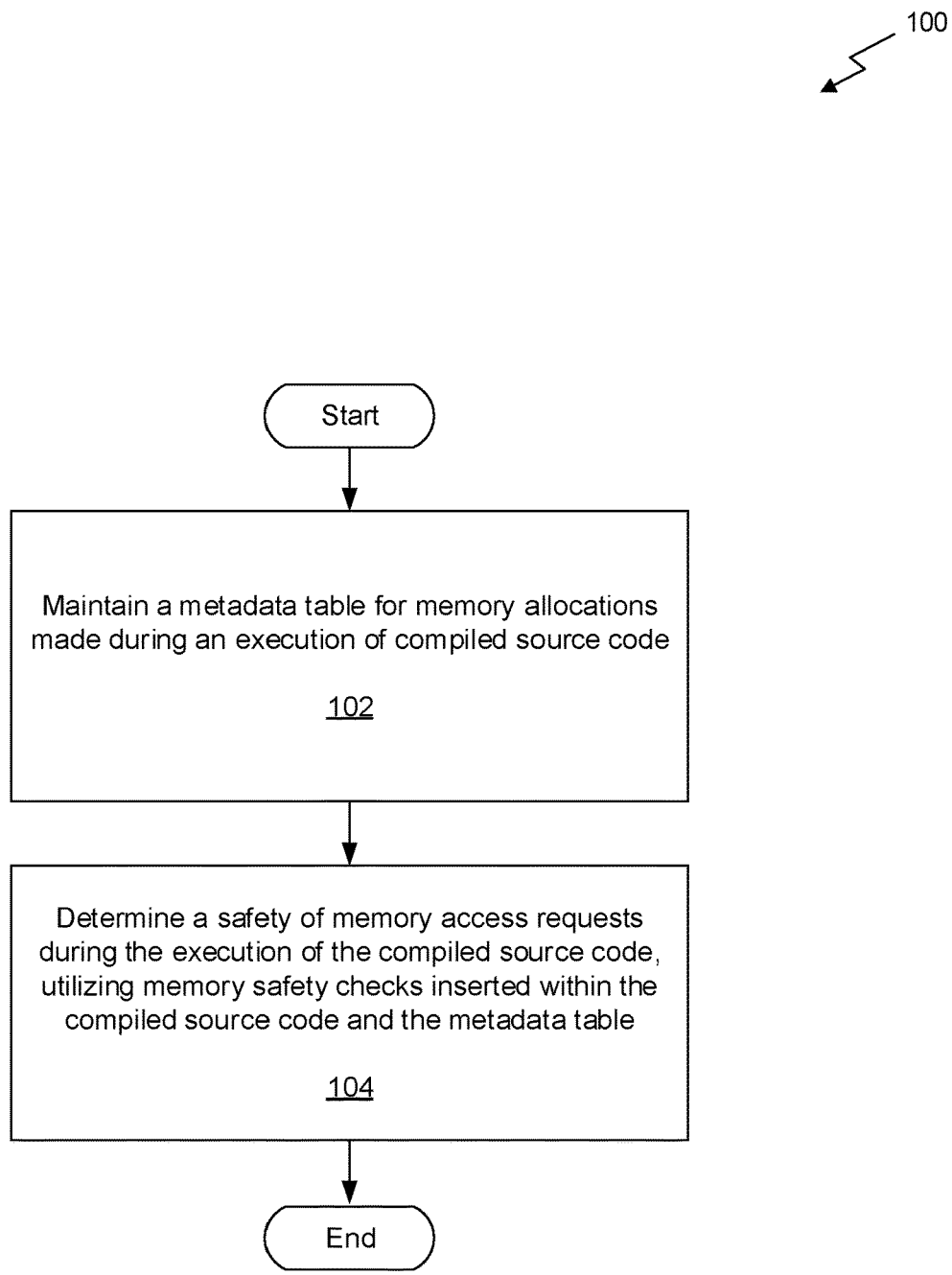
FIG. 1 illustrates a flowchart of a method for implementing compiler-based memory safety for a graphic processing unit (GPU), in accordance with an embodiment.

FIG. 1 illustrates a flowchart of a method 100 for implementing compiler-based memory safety for a graphic processing unit (GPU), in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, a metadata table is maintained for memory allocations made during an execution of compiled source code. In one embodiment, the source code may be presented in a predetermined programming language. In another embodiment, the source code may be input into a compiler, and the compiler may convert the source code to an executable (e.g., compiled source code in binary) to be run by a graphics processing unit (GPU).

Also, in one embodiment, instructions for maintaining the metadata table may be inserted into the source code during a compiling of the source code. For example, at compile time, memory allocation APIs may be added within the source code being compiled, and additional instructions may be inserted within the source code that will create and populate Base and Size Table (BST) entries in response to memory allocations made at runtime (e.g., during the execution of the source code).

Additionally, in one embodiment, each of the memory allocations may return a pointer to a beginning of a requested buffer. For example, each pointer may be returned by an application programming interface (API) in response to a memory allocation (e.g., buffer creation) request made to the API. In another example, the memory allocations may include explicit and/or implicit memory allocations on the stack.

Further, in one embodiment, the memory may include any memory accessed by a GPU to perform one or more operations (e.g., dynamic random-access memory (DRAM), scratch pad memory, local memory, global memory, etc.). In another embodiment, the pointer may be identified within the API, or may be intercepted. In yet another embodiment, the identification/interception of the pointer may be performed during the execution of the compiled source code (e.g., by a runtime library). For example, the runtime library may include routines used by the compiler to invoke behaviors of a runtime environment (e.g., by inserting calls to the runtime library to the executable binary).

Further still, in one embodiment, for each memory allocation made during the execution of the compiled source code, a size of the buffer and a start address of the buffer may be identified from the associated identified/intercepted pointer. In another embodiment, for each memory allocation, the size of the buffer and the start address of the buffer may be stored within the metadata table. For example, the metadata table may include a device-side metadata table. In another example, the metadata table may include a base and size table (BST) containing a plurality of entries, and each of the plurality of entries may include a three-tuple including a base address, a size, and a validity indicator. In yet another example, the size of the buffer and the start address of the buffer may be stored as base and bounds metadata within the metadata table. The base metadata may correspond to the start address of the buffer, and the bounds metadata may correspond to the size of the buffer.

Also, in one embodiment, for each memory allocation, the runtime library may perform the identification and storage of the size of the buffer and the start address of the buffer within the metadata table. In another embodiment, the pointer for each memory allocation may be modified (e.g., by the runtime library) to include an index (e.g., another pointer) that points to a location within the metadata table that contains the size of the buffer and the start address of the buffer for the memory allocation. For example, the index may be added within unused bits within the pointer for each memory allocation.

In this way, during the execution of compiled source code at runtime, a metadata table may be created by the runtime library that logs base and bound metadata for each memory allocation made during the runtime.

Furthermore, as shown in operation 104, a safety of memory access requests is determined during the execution of the compiled source code, utilizing memory safety checks inserted within the compiled source code and the metadata table. In one embodiment, the memory access requests may be included within the executable. In another embodiment, one or more of the memory access requests may include a request to store or load a value to an address.

In one embodiment, the memory safety checks may be inserted into the executable created during the compiling of the source code. For example, during the compiling of the source code, the compiler may insert additional information during the creation of the resulting executable (e.g., the compiled source code) to be run by the GPU. In another embodiment, the additional information may perform a memory safety check during each memory access request within the executable during execution by the GPU. In yet another embodiment, inserting the memory safety checks and the instructions for maintaining the metadata table into the source code during compiling may create an updated executable (e.g., binary) for execution by the GPU.

For example, at compile-time, the compiler may identify memory operations within the source code and may insert additional code before each memory operation that retrieves the operation's pointer metadata from the metadata table, and confirms that the pointer is pointing to a valid location using the retrieved metadata. In one embodiment, the pointer may be tagged. For example, during the compiling of the source code, the compiler may mask off the tag before performing a memory operation so that a load/store operation uses a valid virtual address. Also, the compiler may insert additional code into the binary during the compiling of the source code, where the additional code ensures that pointer arithmetic does not overflow and affect the pointer's tag.

Further still, in one embodiment, determining the safety of memory access requests may include performing, by the executable, an out-of-bounds (OOB) check for such memory access requests during the implementation (e.g., execution) of the executable by the GPU. In another embodiment, when the executable is being executed by the GPU, in response to identifying a memory access request within the executable, a pointer to a memory address included within the memory access request may be identified.

Also, in one embodiment, the pointer may have been previously modified (e.g., during a memory allocation) to include an index that points to a location within the metadata table that contains the size of the buffer and the start address of the buffer for the memory allocation. In another embodiment, the size of an allocated buffer and a start address of the allocated buffer may then be retrieved from the metadata table, utilizing the index.

Additionally, in one embodiment, an out-of-bounds (OOB) check may then be performed in software for the memory address included within the memory access request, utilizing the retrieved size of the allocated buffer and the start address of the allocated buffer. For example, the OOB check may confirm that the pointer to the memory address included within the memory access request points to a valid region of memory (e.g., a region of memory bounded by the retrieved size of the allocated buffer and the start address of the allocated buffer).

Furthermore, in one embodiment, in response to determining that the memory access request points to a valid region of memory, the memory access request may be allowed. In another embodiment, in response to determining that the memory access request points to an invalid region of memory, the memory access request may be denied (e.g., by returning an exception, etc.). In yet another embodiment, in response to determining that the memory access request points to an invalid region of memory, the memory access request may be allowed but reported to a system and/or user. In still another embodiment, in response to determining that the memory access request points to an invalid region of memory, the memory access request may be elided/discarded. In another embodiment, in response to determining that the memory access request points to an invalid region of memory, the memory access request may be redirected to a valid memory region and/or filled with a synthetic value.

In this way, memory safety checks (e.g., 00B checks) may be automatically inserted into a compiled executable and implemented during execution of the executable by the GPU. This may enable the identification and avoidance of unsafe memory operations during the implementation of the executable by the GPU, which may improve a security and performance of the GPU, as well as the hardware environment in which the GPU operates.

Also, in one embodiment, a memory deallocation may be intercepted, and the metadata table may be updated to reflect the memory deallocation (e.g., by invalidating an associated entry within the metadata table, etc.). In another embodiment, an identification of the reuse of an invalidated entry may indicate a temporal memory safety error (e.g., use after free). In yet another embodiment, a safety of only a predetermined subset of all memory access requests made within the system may be determined during the execution of the compiled source code. For example, a safety of only a predetermined type of memory access requests (e.g., read requests, etc.) may be performed. In another example, a safety of only memory access requests made by one or more predetermined entities (e.g., entities other than an operating system, etc.) may be performed.

Figure 2:
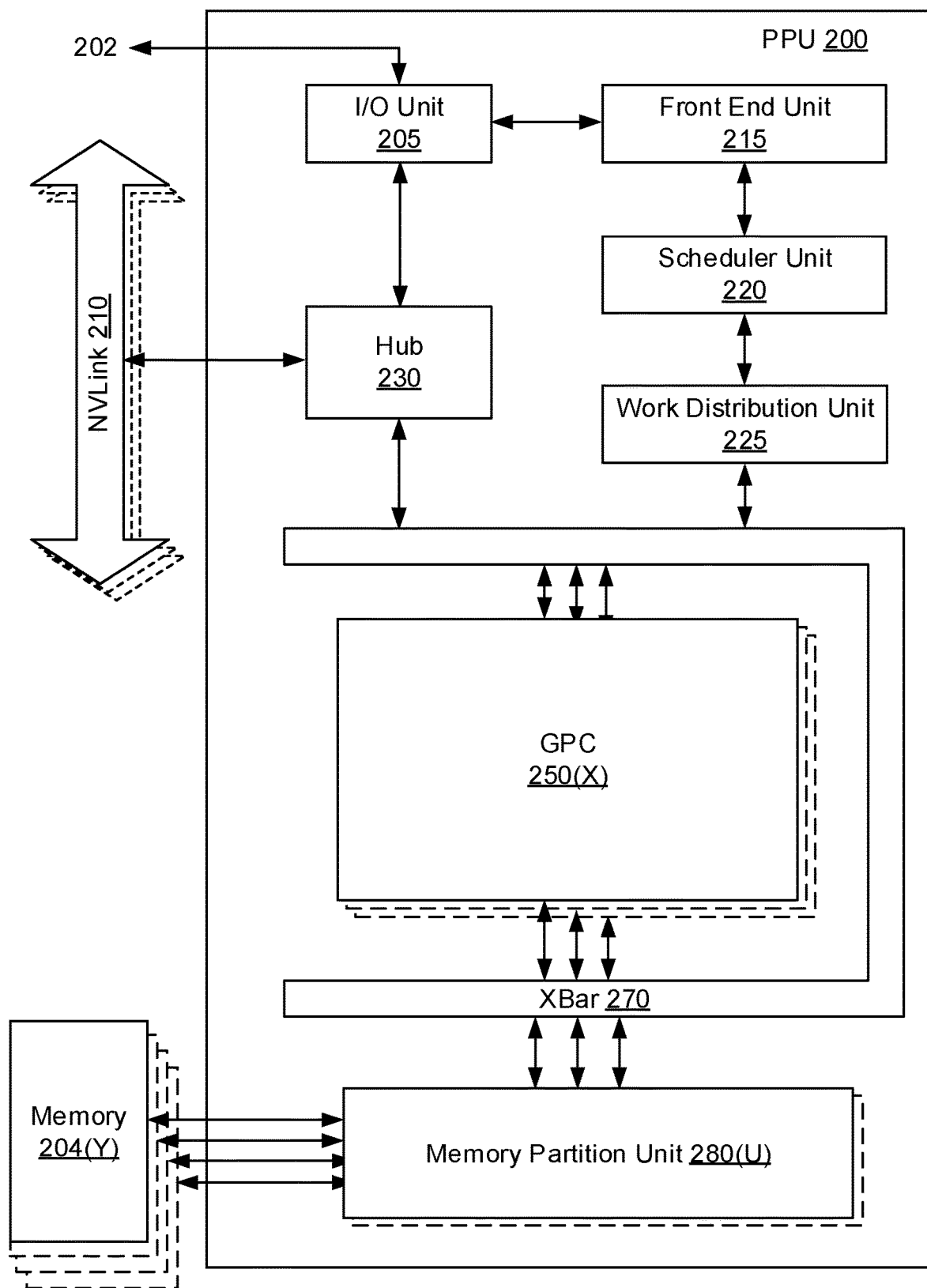
FIG. 2 illustrates a parallel processing unit, in accordance with an embodiment.

In yet another embodiment, the safety determination may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
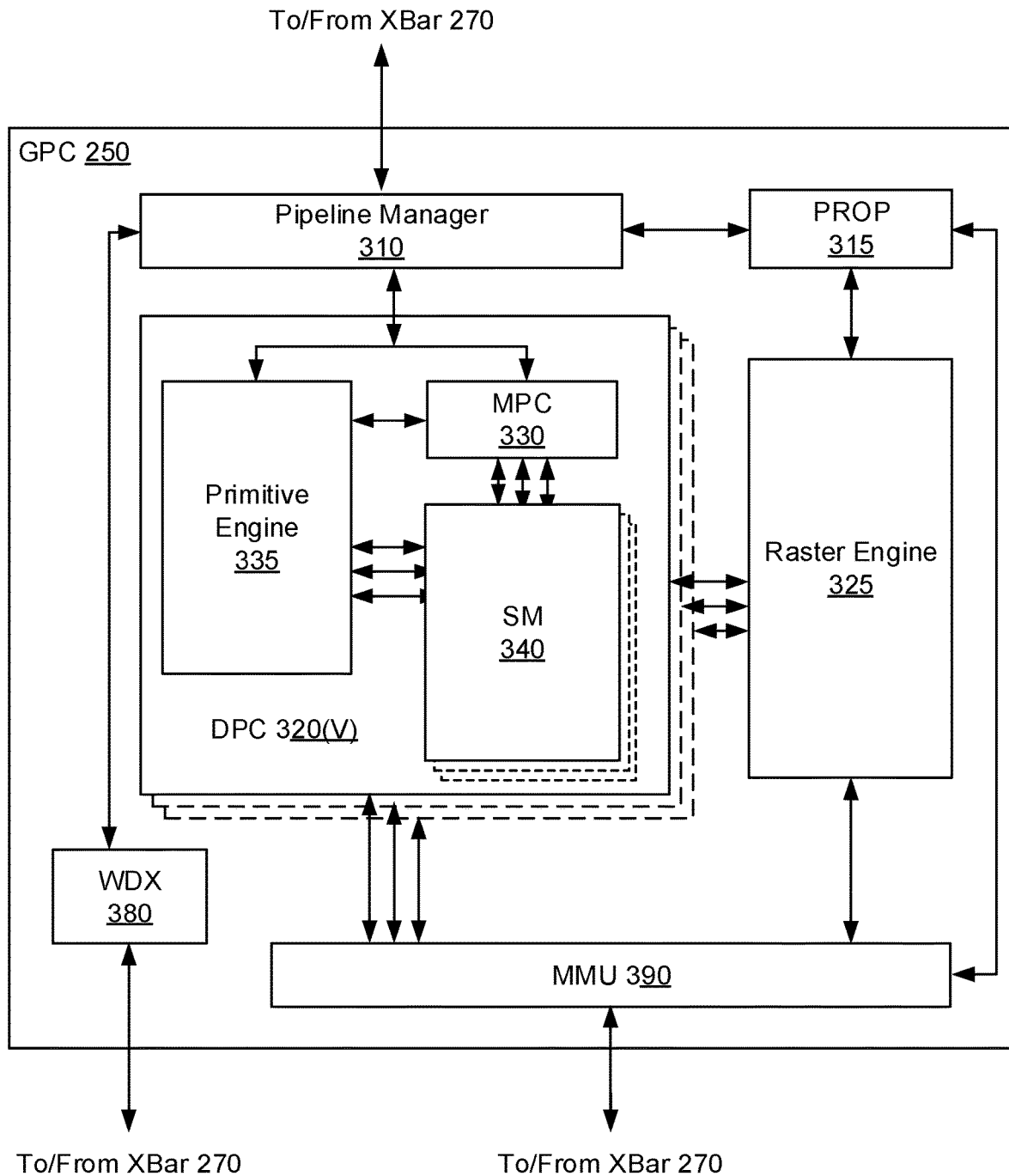
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
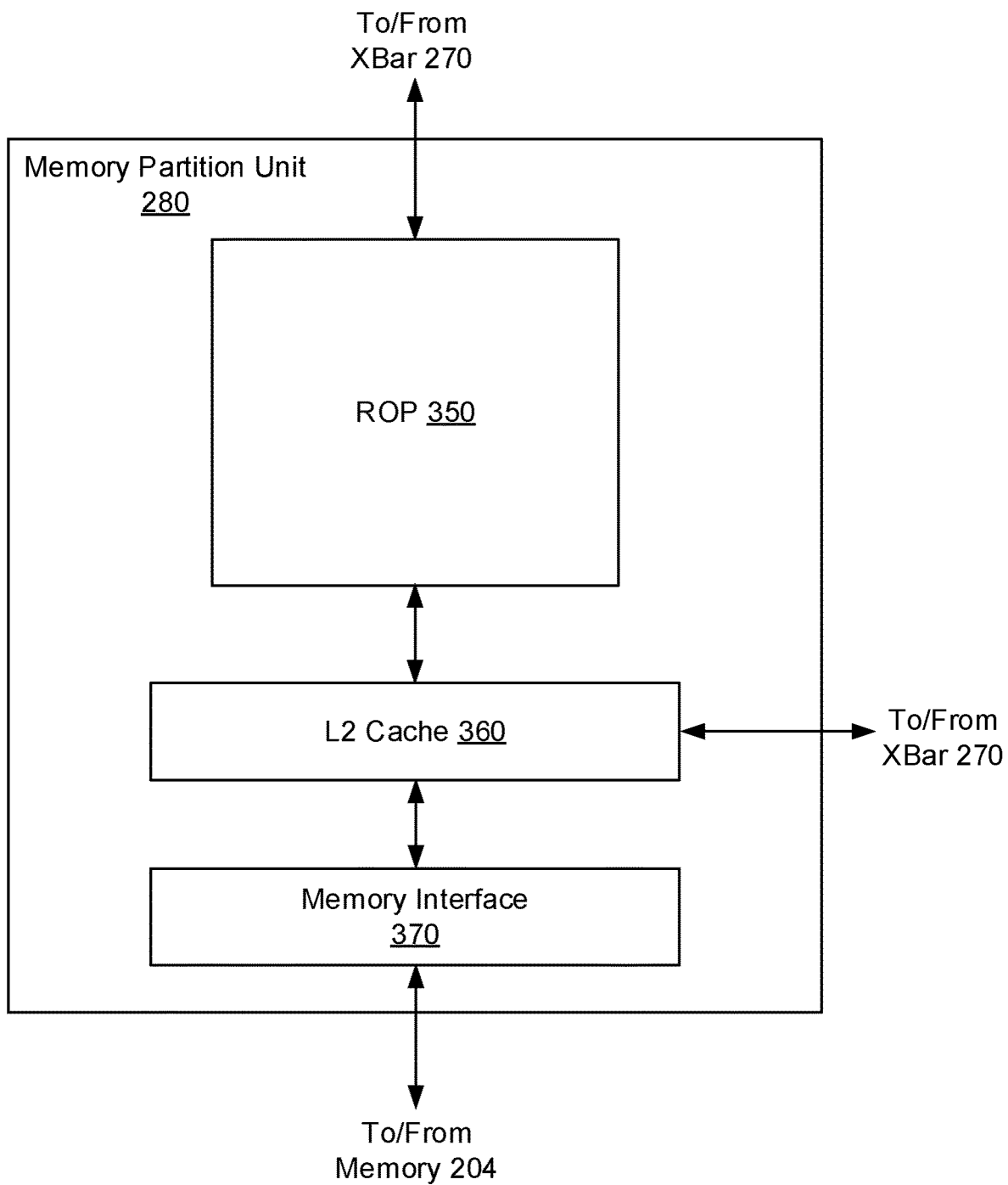
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLB s) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
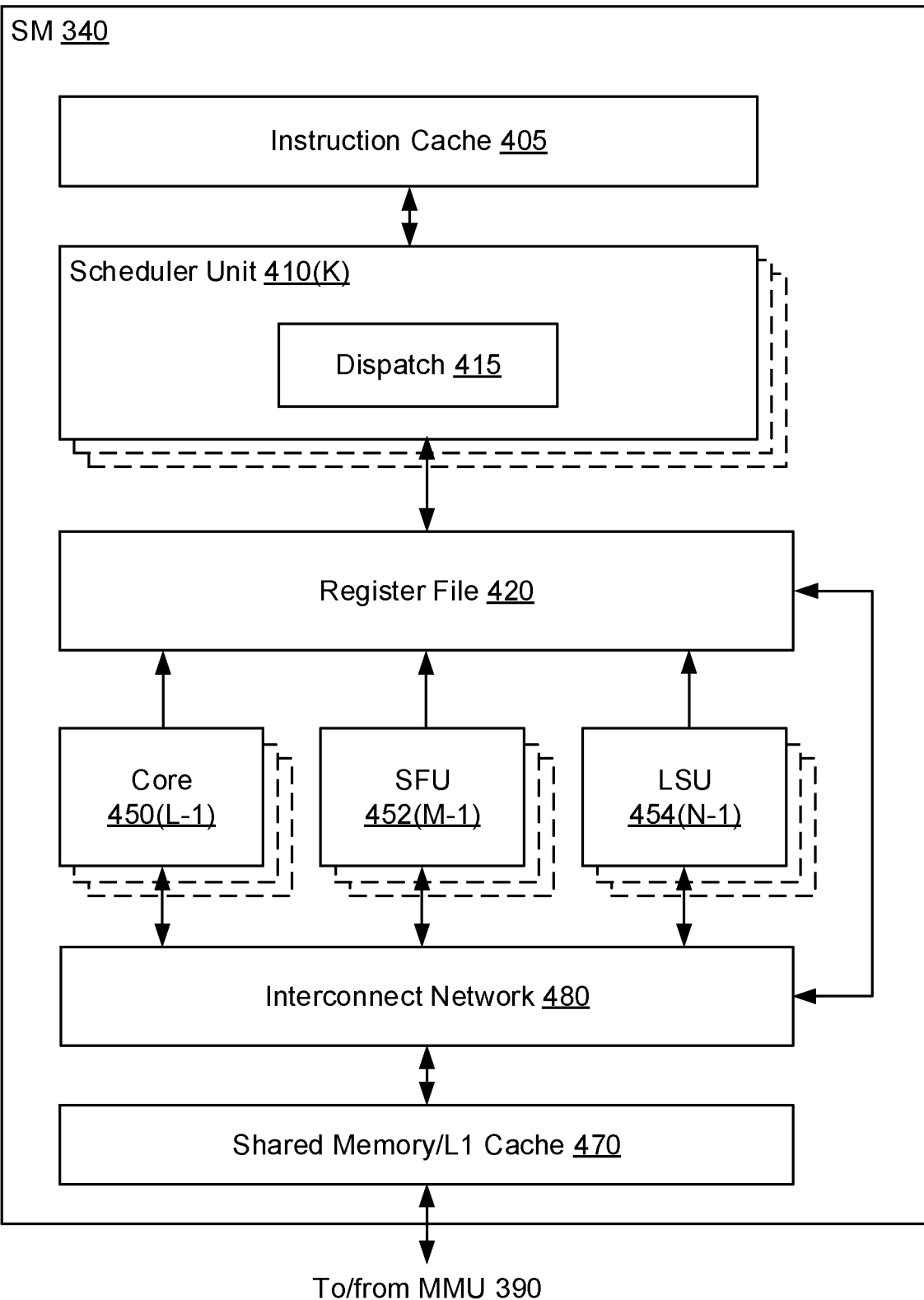
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( )function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
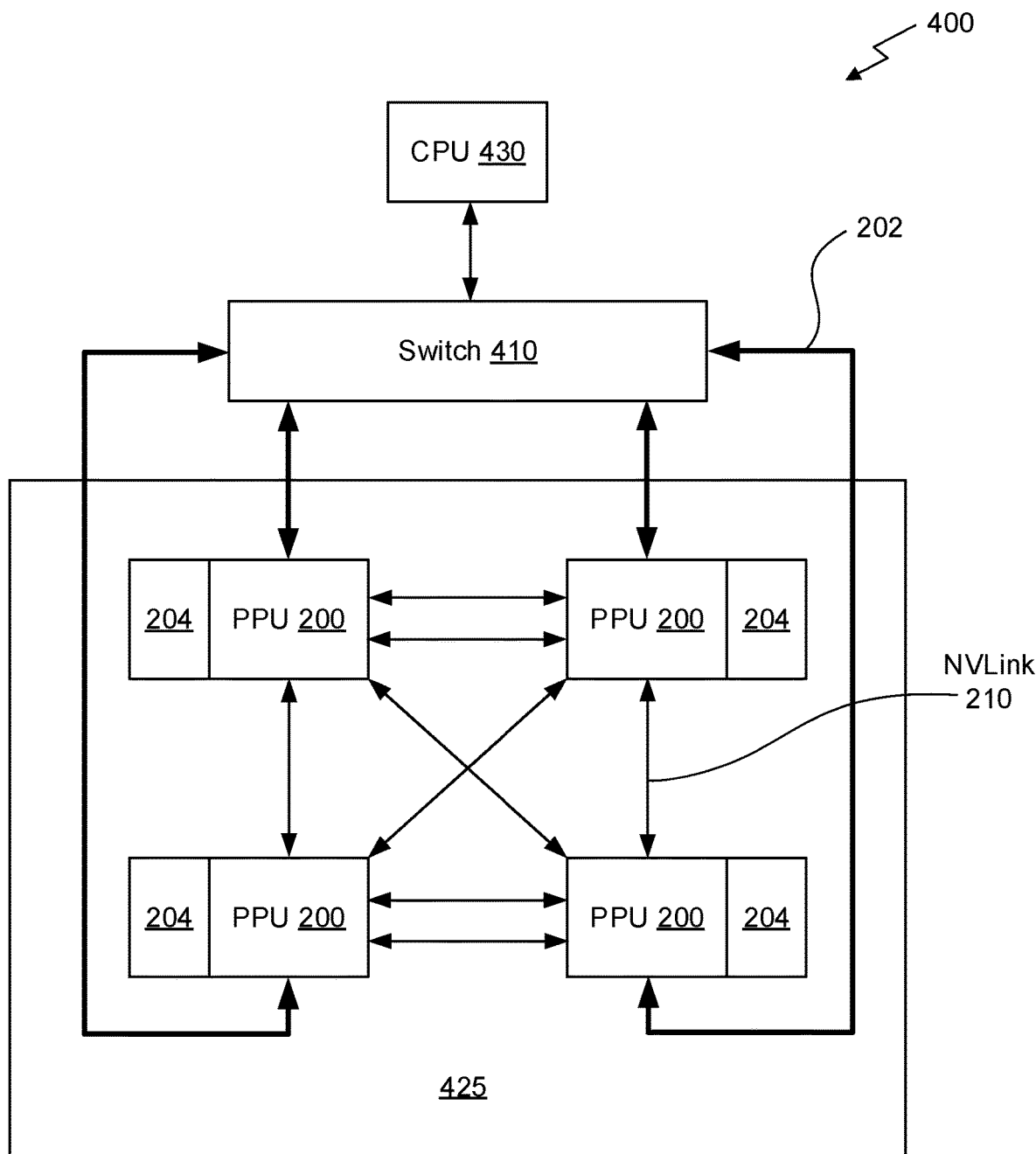
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
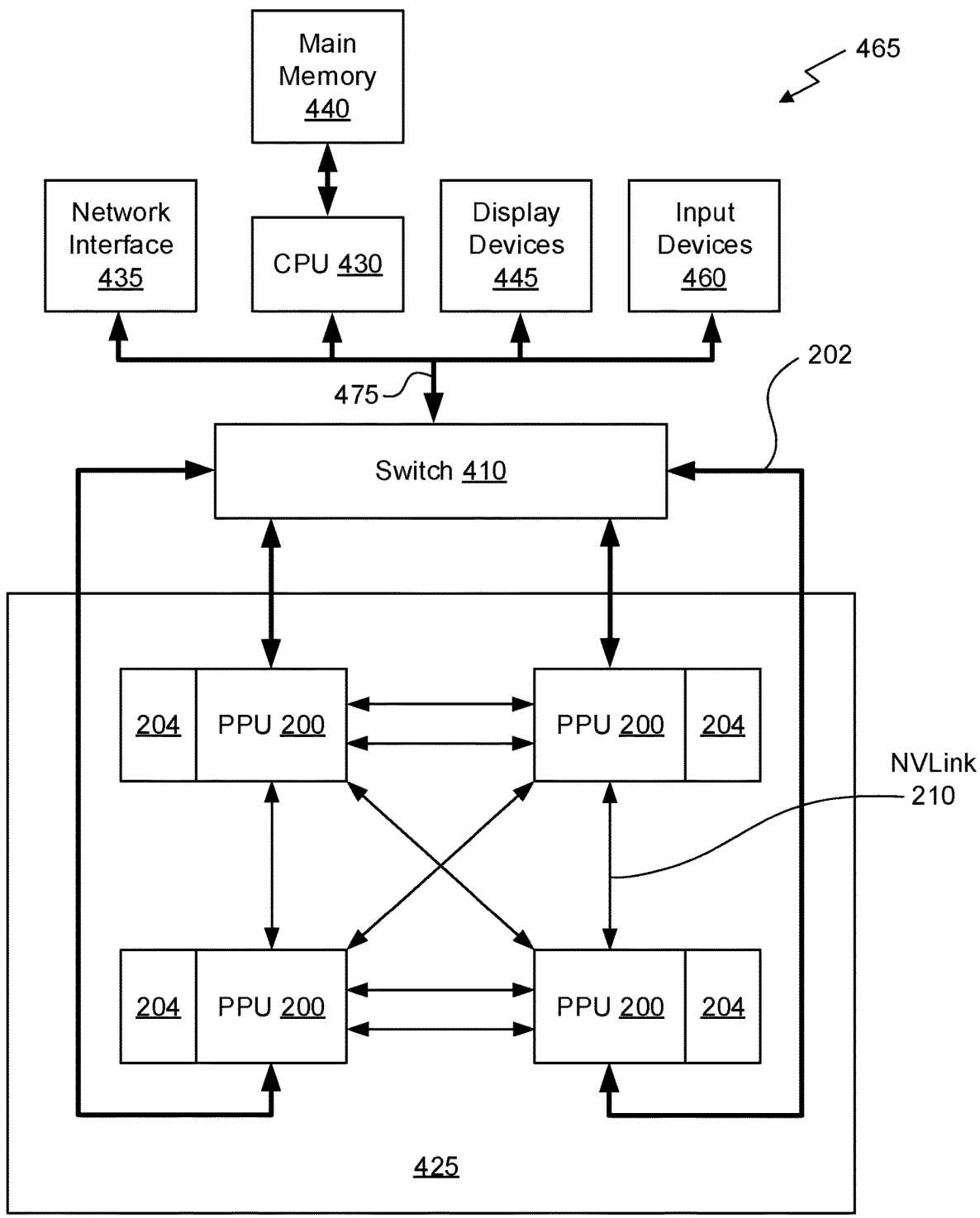
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Exemplary Compiler-Based Environment

Figure 5:
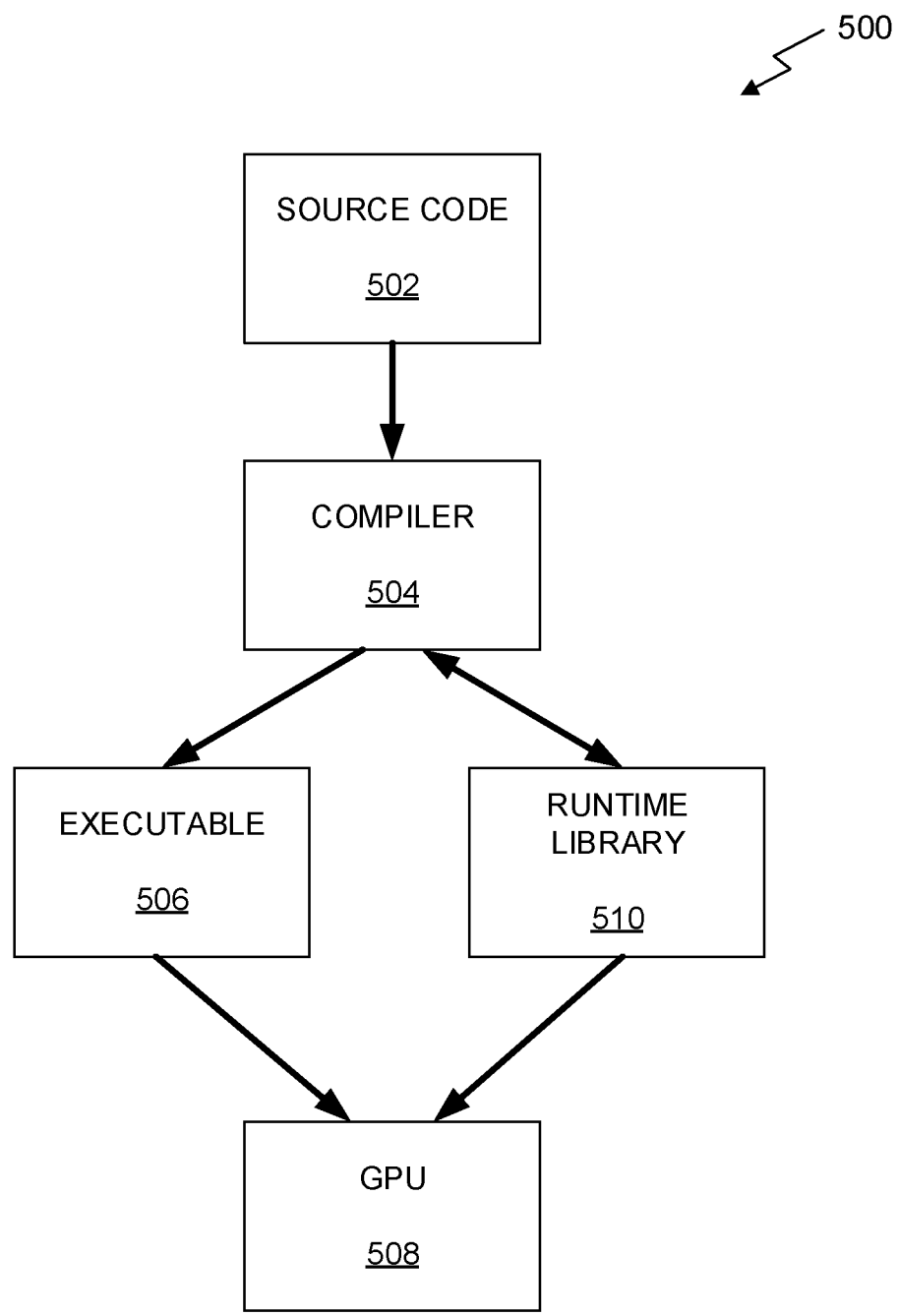
FIG. 5 illustrates an exemplary compiler-based memory safety implementation, in accordance with an embodiment.

FIG. 5 illustrates an exemplary compiler-based memory safety implementation 500, according to one exemplary embodiment. As shown, source code 502 is input into a compiler 504. The compiler 504 may perform one or more operations on the source code 502 to convert the source code 502 to an executable 506 (e.g., in binary) that is received and run by a graphics processing unit (GPU) 508.

Additionally, in one embodiment, the compiler may perform compiling operations by converting the source code 502 into one or more intermediate representations before performing a final conversion to create the executable 506. In another embodiment, during the compiling of the source code 502 by the compiler 504, instructions for maintaining a metadata table may be inserted into the source code to create the executable 506. During the execution of the executable 506 by the GPU 508, a runtime library 510 may intercept memory allocations sent during the execution and may extract a size of a buffer and a start address of the buffer from each memory allocation.

Further, in one embodiment, for each memory allocation made during the execution of the executable 506, the runtime library 510 may store metadata including the extracted buffer size and start address for the memory allocation in a device-side memory, and may add a location of this stored metadata to the memory allocation itself (e.g., as an index within unused bits of the memory address pointer, etc.).

Also, in one embodiment, the compiler 504 may also insert additional information into the executable 506 during the creation of the executable 506. This additional information may perform a memory safety check during each memory access request within the executable 506 during execution by the GPU 508.

For example, when the executable 506 is being executed by the GPU 508, in response to identifying a memory access request within the executable 506, the executable may initiate an out-of-bounds (OOB) check for the memory access request. In response to the OOB check, an index within a memory address pointer included within the memory access request may be identified and used to obtain the buffer size and start address for the associated memory allocation. The buffer size and start address may then be compared to the memory access request to confirm that the pointer to the memory address included within the memory access request points to a valid region of memory.

In this way, the compiler 504 may integrate memory safety checks into its generated executable 506, where such memory checks may use metadata stored in device-side memory to identify and avoid unsafe memory operations during the implementation of the executable 506 by the GPU 508.

A Compiler-Based Memory Safety Solution on GPUs

A compiler-based memory safety solution may include a runtime software mechanism for detecting memory safety violations in programs being compiled and run by a GPU. The compiler-based memory safety solution may be implemented as a compiler pass and a runtime library that involves multiple steps. First, extra instructions may be inserted to intercept memory allocations of all software buffers (e.g., cudaMalloc allocations on the heap and stack resident arrays). The base address returned by the memory allocator and the size of the allocation may be stored in a software-managed in-memory data structure called the Base and Size Table (BST).

The BST may include N segments. Each segment may consist of a plurality of entries. A BST entry may include a three-tuple: {base address, size, valid}. The top log 2N bits of the base address (returned by the memory allocator) may be used to select the appropriate BST segment. An invalid entry may then be chosen (e.g., by linear/random search) from the segment. The index within the BST segment may then be stored in the unused upper 15 bits of the base address (which are normally zero) and returned back to the user program.

Additionally, extra instructions may be inserted where a pointer is first loaded from memory or passed as a device-function argument. The upper bits of the pointer may hold the index of the BST segment. The compiler may insert extra instructions to retrieve the base and size from the appropriate BST. The base and size may be propagated to all loads and stores that use the pointer as an address within the function scope.

Further, the compiler also may insert extra instructions before each load/store to compare whether the load/store address is within the valid range as specified in the BST. Depending on the architecture, further instructions may be required to clear the upper bits in the pointer before executing the load/store instruction (if the architecture requires the upper bits to be zero).

Further still, extra instructions may be inserted to detect temporal memory safety by intercepting free( )calls. The extra instructions clear the contents of the BST entry. This way any dangling pointer, which used to point to the freed allocation, will be detected when a spatial memory safety check is performed (e.g., see the comparison of the load/store address against the base and size information in the BST above). If the BST entry is all zero, then a temporal memory safety violation has occurred.

Also, extra instructions may be inserted to update the valid bit of the oldest deleted BST entry when the BST is full in order to reuse these entries for new allocations. The logic for updating the valid bits may be implementation-specific.

While a compiler compiles source code to create an executable binary, code is added into the compiled source code that, when executed, identifies and stores in a metadata table base and bounds information associated with memory allocations. Additionally, additional code is added into the compiled source code that performs memory safety checks during execution. This updated compiled source code automatically determines a safety of memory access requests during execution by performing an out-of-bounds (OOB) check using the base and bounds information retrieved and stored in the metadata table. This enables the identification and avoidance of unsafe memory operations during the implementation of the executable by a GPU.

The compiler-based memory safety solution may be implemented as a compiler pass and a runtime library in a predetermined infrastructure. The compiler-based memory safety solution may detect both heap and stack-based overflows in test programs.

Compared to existing GPU-based memory safety solutions, the compiler-based memory safety solution may use base and size information to protect memory allocations whereas other techniques rely on software canaries to guard the allocation boundaries. Thus, the compiler-based memory safety solution provides stronger security guarantees as canaries cannot detect out-of-bounds reads and can be bypassed if their size is known.

Second, the compiler-based memory safety solution is a compiler-based solution that operates at the program intermediate representation (IR) whereas prior techniques, such as memcheck, operate at the binary level. This design choice allows the compiler-based memory safety solution to perform better optimizations and have lower runtime overheads.

Hardware-Based Implementation

While a compiler compiles source code to create an executable binary, code is added into the compiled source code that, when executed, identifies and stores in a metadata table base and bounds information associated with memory allocations. Additionally, additional code is added into the compiled source code that enables hardware to determine a safety of memory access requests during an implementation of the compiled source code by performing an out-of-bounds (OOB) check in hardware using the base and bounds information stored in the metadata table. This enables the identification and avoidance of unsafe memory operations during the implementation of the executable by a GPU.

Figure 6:
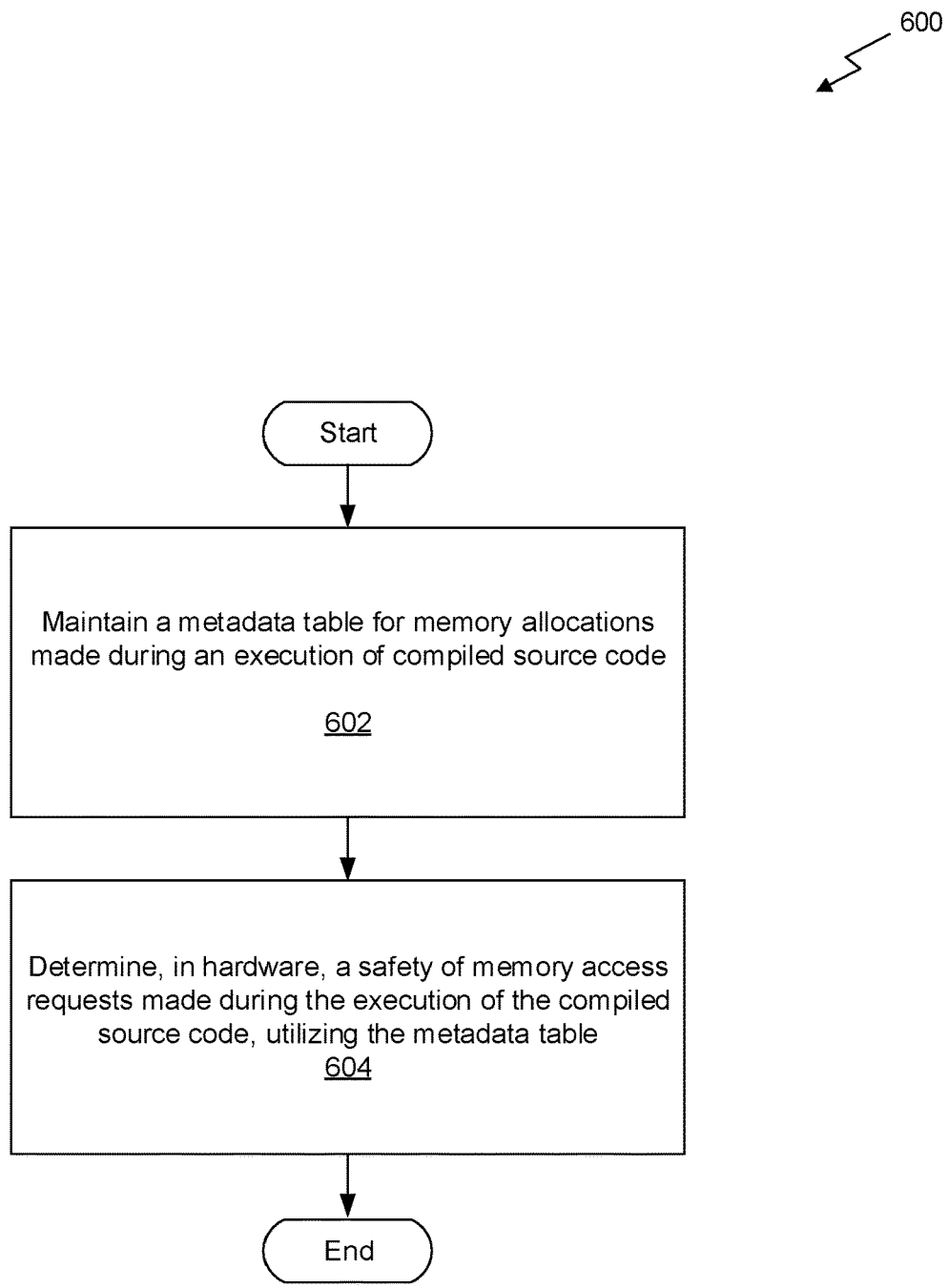
FIG. 6 illustrates a flowchart of a method for implementing hardware-based memory safety for a graphic processing unit (GPU), in accordance with an embodiment.

FIG. 6 illustrates a flowchart of a method 600 for implementing hardware-based memory safety for a graphic processing unit (GPU), in accordance with an embodiment. Although method 600 is described in the context of a processing unit, the method 600 may also be performed by a program, custom circuitry, or by a combination of custom circuitry and a program. For example, the method 600 may be executed by a GPU (graphics processing unit), CPU (central processing unit), or any processing element. Furthermore, persons of ordinary skill in the art will understand that any system that performs method 600 is within the scope and spirit of embodiments of the present invention.

As shown in operation 602, a metadata table is maintained for memory allocations made during an execution of compiled source code. In one embodiment, the source code may be presented in a predetermined programming language. In another embodiment, the source code may be input into a compiler, and the compiler may convert the source code to an executable (e.g., compiled source code in binary) to be run by a graphics processing unit (GPU).

Also, in one embodiment, instructions for maintaining the metadata table may be inserted into the source code during a compiling of the source code. For example, at compile time, memory allocation APIs may be added within the source code being compiled, and additional instructions may be inserted within the source code that will create and populate Base and Size Table (BST) entries in response to memory allocations made at runtime (e.g., during the execution of the source code).

Additionally, in one embodiment, each of the memory allocations may return a pointer to a beginning of a requested buffer. For example, each pointer may be returned by an application programming interface (API) in response to a memory allocation (e.g., buffer creation) request made to the API. In another example, the memory allocations may include explicit and/or implicit memory allocations on the stack.

Further, in one embodiment, the memory may include any memory accessed by a GPU to perform one or more operations (e.g., dynamic random-access memory (DRAM), scratch pad memory, local memory, global memory, etc.). In another embodiment, the pointer may be identified within the API, or may be intercepted. In yet another embodiment, the identification/interception of the pointer may be performed during the execution of the compiled source code (e.g., by a runtime library). For example, the runtime library may include routines used by the compiler to invoke behaviors of a runtime environment (e.g., by inserting calls to the runtime library to the executable binary).

Further still, in one embodiment, for each memory allocation made during the execution of the compiled source code, a size of the buffer and a start address of the buffer may be identified from the associated identified/intercepted pointer. In another embodiment, for each memory allocation, the size of the buffer and the start address of the buffer may be stored within the metadata table. For example, the metadata table may include a device-side metadata table. In another example, the metadata table may include a base and size table (BST) containing a plurality of entries, and each of the plurality of entries may include a three-tuple including a base address, a size, and a validity indicator. In yet another example, the size of the buffer and the start address of the buffer may be stored as base and bounds metadata within the metadata table. The base metadata may correspond to the start address of the buffer, and the bounds metadata may correspond to the size of the buffer.

Also, in one embodiment, for each memory allocation, the runtime library may perform the identification and storage of the size of the buffer and the start address of the buffer within the metadata table. In another embodiment, the pointer for each memory allocation may be modified (e.g., by the runtime library) to include an index (e.g., another pointer) that points to a location within the metadata table that contains the size of the buffer and the start address of the buffer for the memory allocation. For example, the index may be added within unused bits within the pointer for each memory allocation.

In this way, during the execution of compiled source code at runtime, a metadata table may be created by the runtime library that logs base and bound metadata for each memory allocation made during the runtime.

Also, in one embodiment, a hardware memory safety cache may store recently-retrieved entries within the metadata table (e.g., in order to improve a speed of retrieval of the recently-retrieved entries, etc.).

Furthermore, in one embodiment, an arithmetic logic unit (ALU) may be adjusted to maintain these unused bits during compiling after pointer arithmetic operations are performed on the pointer. This may ensure that the index is maintained after these operations are performed. In this way, during the running of the compiled source code, a hardware memory safety cache may be created by the runtime library that caches recently retrieved base and bound metadata from the metadata table.

Also, as shown in operation 604, a safety of memory access requests is determined in hardware during an execution of the compiled source code, utilizing the metadata table. In one embodiment, the memory access requests may be included within the executable (e.g., the compiled source code). In another embodiment, one or more of the memory access requests may include a request to store a value to an address.

Additionally, in one embodiment, determining the safety of memory access requests may include performing, in hardware, an out-of-bounds (OOB) check for such memory access requests during the implementation (e.g., execution) of the executable by the GPU. In another embodiment, when the executable is being executed by the GPU, in response to identifying a memory access request within the executable, a hardware load/store unit may identify an associated load/store address included within the memory access request. For example, the load/store address may include a pointer that was previously modified (e.g., during a memory allocation) to include an index that points to a location within the hardware memory safety cache that contains the size of the buffer and the start address of the buffer for the memory allocation. In another embodiment, during the compiling of the source code, specific load/store instructions may be inserted within the compiled source code that implement the OOB check in hardware.

Further, in one embodiment, the hardware load/store unit may send the load/store address to memory safety hardware (e.g., a memory safety unit). In another embodiment, in response to receiving the load/store address, the memory safety hardware may first determine if a cached metadata table entry corresponding to the address exists within the hardware memory safety cache. In response to determining that the cached metadata table entry corresponding to the address exists within the hardware memory safety cache, the entry may be used to perform an out-of-bounds (OOB) check. In response to determining that the cached metadata table entry corresponding to the address does not exist within the hardware memory safety cache, the memory safety hardware may add the index from the load/store address to the base address to obtain an accurate index value for the metadata table.

Further still, in one embodiment, the memory safety hardware may then retrieve the size of an allocated buffer and a start address of the allocated buffer from the metadata table, utilizing the accurate index value. In another embodiment, an out-of-bounds (OOB) check may then be performed by the memory safety hardware for the memory address included within the memory access request, utilizing the retrieved size of the allocated buffer and the start address of the allocated buffer. For example, the OOB check may confirm that the pointer to the memory address included within the memory access request points to a valid region of memory (e.g., a region of memory bounded by the retrieved size of the allocated buffer and the start address of the allocated buffer).

Also, in one embodiment, results of the OOB check may then be returned from the memory safety hardware to the hardware load/store unit. In another embodiment, in response to determining that the memory access request points to a valid region of memory, the memory access request may be implemented by the hardware load/store unit (e.g., in an L1 cache, etc.). In yet another embodiment, in response to determining that the memory access request points to an invalid region of memory, the memory access request may be denied by the hardware load/store unit.

In another embodiment, a memory deallocation may be intercepted, and the hardware memory safety cache may be updated to reflect the memory deallocation (e.g., by invalidating an associated entry within the hardware memory safety cache, etc.). In yet another embodiment, a safety of only a predetermined subset of all memory access requests made within the system may be determined during the execution of the compiled source code. For example, a safety of only a predetermined type of memory access requests (e.g., read requests, etc.) may be performed. In another example, a safety of only memory access requests made by one or more predetermined entities (e.g., entities other than an operating system, etc.) may be performed.

In this way, memory safety checks (e.g., OOB checks) may be inserted into a compiled executable and implemented in hardware during execution of the executable by the GPU. This may enable the identification and avoidance of unsafe memory operations during the implementation of the executable in hardware by the GPU without any performance overhead, and may therefore improve a security and performance of the GPU, as well as the hardware environment in which the GPU operates.

In yet another embodiment, the safety determination may be performed utilizing a parallel processing unit (PPU) such as the PPU 200 illustrated in FIG. 2.

Exemplary Hardware-Based Environment

Figure 7:
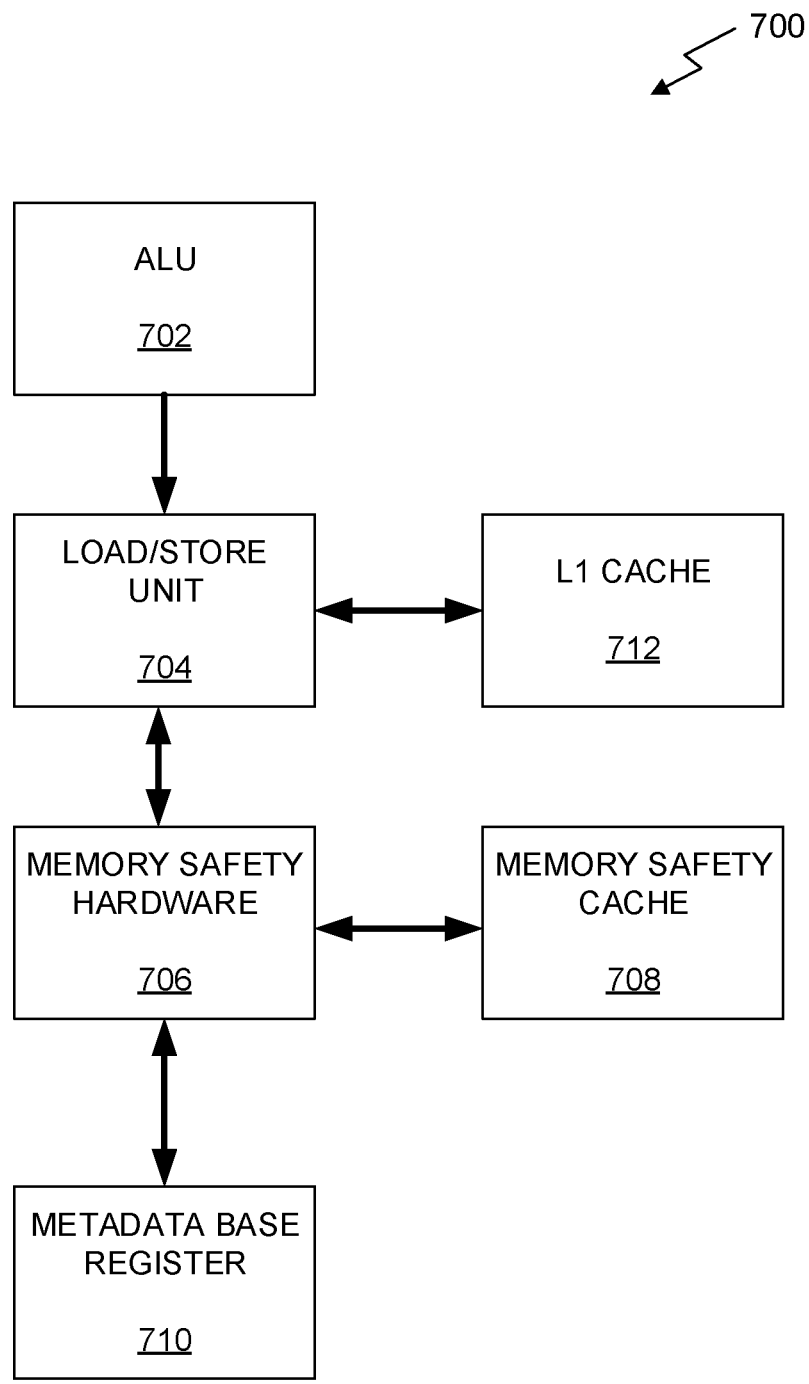
FIG. 7 illustrates an exemplary hardware-implemented memory safety implementation, in accordance with an embodiment.

FIG. 7 illustrates an exemplary hardware-implemented memory safety implementation 700, according to one exemplary embodiment. As shown, an arithmetic logic unit (ALU) 702 is in communication with a load/store unit 704. In one embodiment, in response to a memory access request, the ALU 702 may send a load/store address associated with the memory access request to the load/store unit 704.

Additionally, in one embodiment, the load/store unit 704 may send the address to memory safety hardware 706 to perform an OOB check. In response to receiving the address, the memory safety hardware 706 may retrieve a base address for a hardware memory safety cache 708 from a metadata base register 710. In response to retrieving the base address, the memory safety hardware 706 may add an index from the load/store address to the base address to obtain an accurate index value for the hardware memory safety cache 708.

Further, in one embodiment, the memory safety hardware may then retrieve the size of an allocated buffer and a start address of the allocated buffer from the hardware memory safety cache 708, utilizing the accurate index value. An out-of-bounds (OOB) check may then be performed by the memory safety hardware 706 for the memory address included within the memory access request, utilizing the retrieved size of the allocated buffer and the start address of the allocated buffer.

Further still, in one embodiment, results of the OOB check may be returned from the memory safety hardware 706 to the hardware load/store unit 704. In response to determining that the memory access request points to a valid region of memory, the memory access request may be implemented by the hardware load/store unit 704 in an L1 cache 712.

In this way, memory safety checks may be automatically implemented via hardware while running an executable, where such memory checks use metadata stored within the memory safety cache 708 to identify and avoid unsafe memory operations during the implementation of the executable by a GPU.

A Hardware-Assisted Memory Safety Solution on GPUs

A hardware-assisted memory safety solution includes a runtime hardware/software mechanism for detecting memory safety violations in programs that are compiled and run by GPUs. The hardware-assisted memory safety solution includes exemplary software changes and hardware changes as described below.

The hardware-assisted memory safety solution may include a compiler pass to perform the following steps. First, extra instructions may be inserted to intercept a memory allocation of all software buffers (e.g., cudaMalloc allocations on the heap and stack resident arrays). The base address returned by the memory allocator and the size of the allocation are stored in a software-managed in-memory data structure such as a Base and Size Table (BST). In one example, the BST may consist of N segments. Each segment consists of a predetermined number of entries. A BST entry may consist of a three-tuple: {base address, size, valid}.

In one embodiment, the top log 2N bits of the base address (returned by the memory allocator) are used to select the appropriate BST segment. An invalid entry is then chosen (e.g., by linear/random search) from the segment. The index within the BST segment is then stored in the unused upper bits of the base address (which may be normally zero) and is then returned back to the user program.

The ISA may be extended with new memory safety load/store instructions and pointer arithmetic instructions. The compiler pass replaces load/store instructions and pointer arithmetic instructions with the new memory safety load/store and pointer arithmetic instructions. In one embodiment, the instruction set architecture (ISA) may include additional instructions inserted during compiling that perform memory safety by specifying memory instructions to perform a memory safety check. In another embodiment, the ISA may include additional instructions inserted during compiling that perform address computation functionality by ensuring that address bits used to index the metadata table remain unmodified after arithmetic is done to the address bits.

The hardware-assisted memory safety solution may include the following hardware changes. The hardware may be extended with a Memory Safety Unit (MSU) that performs the bounds check by retrieving the BST entry (rather than using instructions). The MSU is consulted in parallel to accessing the L1 cache (in the same way virtual to physical address translation is done in conventional virtually-indexed physically-tagged (VIPT) L1 caches). The MSU consists of a buffer to cache the BST (similar to a TLB) and logic to ensure the address is within legitimate bounds.

The ALUs are extended to support memory safety pointer arithmetic. Specifically, support may be added to ensure that the upper bits (storing the BST entry) are not changed by instructions performing pointer arithmetic. The ALU modification ensures that upper bits of the address remain unchanged after the operation (which amounts to adding a single MUX to the existing ALU operation).

The above software and hardware changes combined eliminate any performance overhead compared to a compiler approach when evaluated across various workloads.

Compared to existing techniques, the hardware-assisted memory safety solution uses the upper pointer bits as an index to the metadata table whereas other solutions use the pointer location in memory to derive the address of its metadata.

Unlike earlier solutions, the hardware-assisted memory safety solution does not increase the application code footprint by adding explicit bounds checking and retrieval instructions. Instead, all memory safety functionalities are performed in hardware using the same existing program instructions.

Unlike existing solutions, the hardware-assisted memory safety solution does not store 4-bit or 8-bit tags per every allocation in physical memory. As a result, no changes to the data layout in caches and DRAM are required. The hardware-assisted memory safety solution is memory-allocator agnostic and does not require a binning memory allocator.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
maintaining a metadata table having entries for memory allocations made during an execution of compiled source code; and determining, in hardware, a safety of memory access requests during the execution of the compiled source code, utilizing the metadata table, including: when the compiled source code is being executed by a GPU (Graphical Processing Unit), in response to identifying a memory access request within the compiled source code, a hardware load/store unit identifies an associated load/store address included within the memory access request, the hardware load/store unit sends the load/store address to memory safety hardware, and in response to receiving the load/store address the memory safety hardware requests a base address for a hardware memory safety cache from a metadata base register, where the hardware memory safety cache caches recently used data from the metadata table.

2. The method of claim 1, wherein each of the memory allocations includes a pointer to a beginning of a requested buffer.

3. The method of claim 2, wherein the pointer is identified or intercepted during the execution of the compiled source code.

4. The method of claim 1, wherein for each memory allocation, a size of a buffer and a start address of the buffer are identified and stored within the metadata table as base and bounds metadata.

5. The method of claim 1, wherein a pointer for each memory allocation is modified to include an index that points to a location within a metadata table that contains a size of a buffer and a start address of the buffer for the memory allocation.

6. The method of claim 1, wherein during the execution of the compiled source code, the hardware performs a memory safety check during each memory access request within the compiled source code.

7. The method of claim 1, wherein the memory access requests each include a request to store a value to an address.

8. The method of claim 1, wherein determining the safety of memory access requests includes performing, in hardware, an out-of-bounds (OOB) check for such memory access requests during the execution of the compiled source code by the GPU.

9. The method of claim 1, wherein the memory safety hardware adds an index from the load/store address to the base address to obtain an accurate index value for the hardware memory safety cache.

10. The method of claim 9, wherein the memory safety hardware retrieves the size of an allocated buffer and a start address of the allocated buffer from the hardware memory safety cache, utilizing the accurate index value.

11. The method of claim 10, wherein an out-of-bounds (OOB) check is performed by the memory safety hardware for a memory address included within the memory access request, utilizing the retrieved size of the allocated buffer and the start address of the allocated buffer.

12. The method of claim 11, wherein results of the OOB check are returned from the memory safety hardware to the hardware load/store unit, and in response to determining that the memory access request points to a valid region of memory, the memory access request is implemented by the hardware load/store unit in an L1 cache.

13. The method of claim 1, wherein an instruction set architecture (ISA) includes additional instructions inserted during compiling that perform memory safety by specifying memory instructions to perform a memory safety check.

14. The method of claim 1, wherein an instruction set architecture (ISA) includes additional instructions inserted during compiling that perform address computation functionality by ensuring that address bits used to index the metadata table remain unmodified after arithmetic is done to the address bits.

15. The method of claim 1, wherein:
the memory safety hardware uses the top log 2N bits of the base address to select a metadata segment,
an invalid entry is chosen from the metadata segment, and
an index within the metadata segment is stored in an unused number of bits of the base address.

16. The method of claim 1, wherein the metadata table is a base and size table (BST) containing the entries for the memory allocation, and wherein each of the entries includes a base address, a size, and a validity indicator corresponding to the memory allocation.

17. The method of claim 1, wherein an index pointing to a location within the metadata table is added to a pointer for each of the memory allocations.

18. The method of claim 17, wherein the index points to the location within the metadata table that contains a size of a buffer for the memory allocation and a start address of the buffer.

19. The method of claim 1, wherein the metadata table is created during the execution of the compiled source code at runtime.

20. A system comprising:
a hardware processor of a device that is configured to:
maintain a metadata table having entries for memory allocations made during an execution of compiled source code; and
determine, in hardware, a safety of memory access requests during the execution of the compiled source code, utilizing the metadata table
wherein:
the memory safety hardware uses the top log 2N bits of the base address to select a metadata segment,
an invalid entry is chosen from the metadata segment, and
an index within the metadata segment is stored in an unused number of bits of the base address.

21. The system of claim 20, wherein each of the memory allocations includes a pointer to a beginning of a requested buffer.

22. The system of claim 21, wherein the pointer is identified or intercepted during the execution of the compiled source code.

23. The computer-readable storage medium of claim 20, wherein each of the memory allocations includes a pointer to a beginning of a requested buffer.

24. A non-transitory computer-readable storage medium storing instructions that, when executed by a processor of a device, causes the processor to cause the device to:
maintain a metadata table having entries for memory allocations made during an execution of compiled source code; and
determine, in hardware, a safety of memory access requests during the execution of the compiled source code, utilizing the metadata table;
wherein an instruction set architecture (ISA) includes additional instructions inserted during compiling that perform address computation functionality by ensuring that address bits used to index the metadata table remain unmodified after arithmetic is done to the address bits.

* * * * *